UNITED STATES PATENT OFFICE.

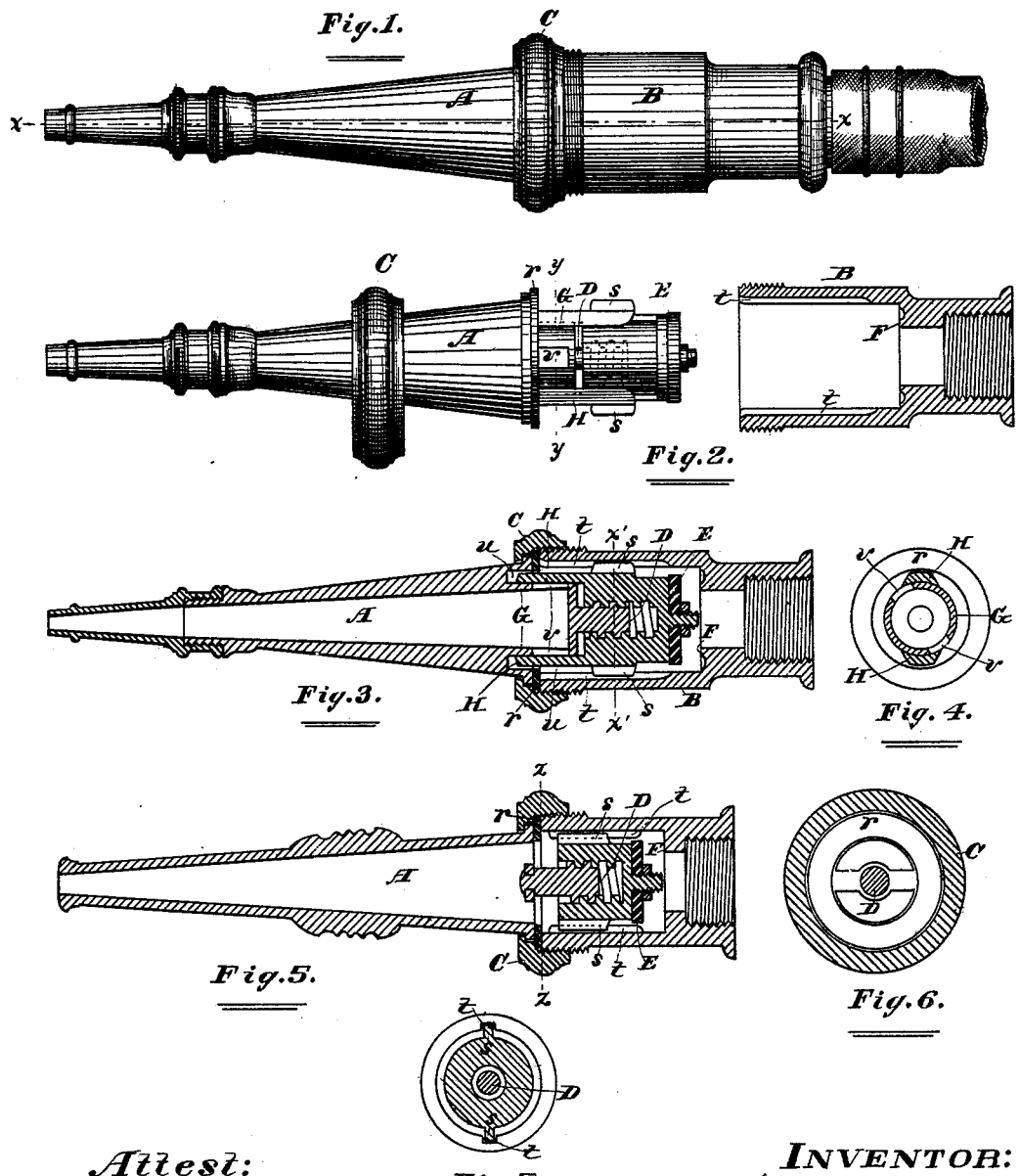

JOHN CLIFFORD, OF CHICAGO, ILLINOIS.

HOSE-NOZZLE.

SPECIFICATION forming part of Letters Patent No. 229,521, dated July 6, 1880.

Application filed March 18, 1880. (No model.)

*To all whom it may concern:*

Be it known that I, JOHN CLIFFORD, of the city of Chicago, in the county of Cook and State of Illinois, have invented certain new and useful Improvements in Hose-Nozzles; and I hereby declare the following to be a full, clear, and exact description thereof, reference being had to the accompanying drawings, of which—

Figure 1 is a side elevation of my improved nozzle; Fig. 2, a view, partly in section, showing the parts detached; Fig. 3, a longitudinal section on the line $x\ x$, Fig. 1; Fig. 4, a cross-section on the line $y\ y$, Fig. 2; Fig. 5, a longitudinal central section, showing the nozzle provided with only part of my improvements; Fig. 6, a cross-section on the line $z\ z$, Fig. 5; and Fig. 7, a cross-section on the line $x'\ x'$, Fig. 3.

My invention relates especially to nozzles for garden-hose; and it consists, first, in the combination of parts by means of which a compression-valve moving in the direction of the water-way without revolving is opened and closed by the turning of the outer part of the nozzle; also, in the mechanism whereby the stream thrown may, at the will of the operator, be either a solid one or be caused to rotate spirally and assume the form of a spray, coarse or fine, as may be desired; and, furthermore, in certain details of construction, all as hereinafter more fully set forth.

In the drawings, A and B represent the two parts of the nozzle, which are connected together by means of the coupling C, and provided with a washer, $r$, to form a tight joint. The coupling C, it will be seen, screws upon the part B only, thus leaving the part A free to rotate.

D is a screw in line with the axis of the nozzle, and rigidly fixed to a suitable bearing in the end of the part A, said bearing having openings for the free passage of the water.

E is a compression-valve, threaded internally to correspond with the screw D, over which it fits, and provided with lugs $s$, which fit and slide within guides $t$ in the part B, whereby the said valve is precluded from turning with the screw.

The guides $t$ may be in the form either of grooves, as shown in Figs. 2 and 3, or projections, as shown in Fig. 5.

F is the seat of the valve, consisting of a shoulder formed within the part B.

From the foregoing description it will readily be seen that by holding the part B firmly in one hand and turning the part A with the other the valve D is caused to move to or from the seat F, according to the direction of the turning, for the screw, being rigidly fixed to the part A, revolves with the latter, thus carrying the valve in or out, as the case may be, along the guides. By forcing the valve hard against the seat F the flow is completely shut off, and by opening it more or less by the turning of the part A a stream is produced of any desired force and volume within predetermined limits.

So much of my device as has been thus far described relates only to the throwing of a solid stream; and while this may in many cases be all that is required, it is far more frequently desirable to have the device capable of such regulation as to throw either a solid stream or a spray, as circumstances shall demand. I accomplish this end by constructing the bearing which connects the screw D to the part A in the form of a hollow cylinder, G, set into the end of the part A, (or, more generally, cast in one piece with it,) and projecting beyond the same, as shown, and having an exterior diameter less than the interior diameter of the part B, whereby, when the latter is screwed into place, an annular space, $u$, subsists between the two. This annular space is preferably continued for a short distance into the part A, as represented in Fig. 3.

The cylinder G is provided with two ports, $v$, in opposite sides, and the valve E with two projections, H, extending into the annular space $u$, and fitting close against the sides of the cylinder G. These projections are of greater breadth than the ports, and are of such length as to reach a little beyond them when the valve is shut. Thus by turning the part A the ports $u$ may be brought more or less under the projections G, and their breadth thereby graduated to any desired degree. The partial closing of the ports imparts to the water passing through a rotary or spiral motion, and causes it to escape from the end of the nozzle in the form of a spray of greater or less density, according to the extent to which the ports are covered.

My device in its complete form, as last described, possesses all the requisites of a perfect nozzle. It is simple, economically made, not liable to get out of repair, and extremely easy to operate and control. Even when the spray-producing mechanism is omitted my device possesses great advantages over nozzles constructed in the ordinary way, with a cock or a rotating valve, on account of its greater durability, combined with the facility of its operation and its economical construction. Besides this, the ground-in keys of the ordinary hose-nozzles soon leak and rapidly become useless from this cause. These are all matters of primary importance. Add to this the attachment whereby the stream thrown may be brought through the various stages ranging from a perfectly solid one to the finest spray, all by a mere turn of the wrist, and it is clear that a device is produced which is adapted to perform every function which can possibly be desired.

What I claim as new, and desire to secure by Letters Patent, is—

1. In a hose-nozzle, the combination of the part A, carrying the screw D, part B, having the seat F, coupling C, valve E, and mechanism for preventing said valve from rotating, substantially as described.

2. In a hose-nozzle, the valve E, having projections H, for regulating and diverging the water through ports $v$, and causing it to rotate spirally through the part A for the purpose of forming a spray, substantially as described.

3. The cylinder G upon the part A, provided with the screw D and with ports $v$, in combination with the valve E, having projections H, as and for the purpose set forth.

4. The combination, in a hose-nozzle, of the part A, part B, having the seat F, coupling C, valve E, mechanism for preventing the valve from rotating, and cylinder G, carrying the screw D, and provided with ports $v$, substantially as described.

JOHN CLIFFORD.

In presence of—
P. C. DYRENFORTH,
WM. B. CLIFFORD.